US012488773B2

(12) United States Patent
Lee et al.

(10) Patent No.: US 12,488,773 B2
(45) Date of Patent: Dec. 2, 2025

(54) LIQUID OXYGEN VENT SILENCER USED IN OXYGEN PRODUCTION PROCESS

(71) Applicant: LET ENGINEERING CO., LTD., Hwaseong-si (KR)

(72) Inventors: Ju Sik Lee, Ansan-si (KR); Hyung Dong Lee, Gyeonggi-do (KR); Sun Byeul Jo, Gyeongsan-si (KR); Won Myeong Seo, Incheon (KR); Tae Kyu Kim, Asan-si (KR); Dong Guen Lee, Ansan-si (KR)

(73) Assignee: LET ENGINEERING CO., LTD., Hwaseong-si (KR)

( * ) Notice: Subject to any disclaimer, the term of this patent is extended or adjusted under 35 U.S.C. 154(b) by 0 days.

(21) Appl. No.: 19/060,462

(22) Filed: Feb. 21, 2025

(65) Prior Publication Data

US 2025/0191564 A1 Jun. 12, 2025

Related U.S. Application Data

(63) Continuation of application No. PCT/KR2023/013879, filed on Sep. 15, 2023.

(30) Foreign Application Priority Data

Sep. 6, 2022 (KR) ........................ 10-2022-0113034
Sep. 16, 2022 (KR) ........................ 10-2022-0117174
Sep. 19, 2022 (KR) ........................ 10-2022-0118085

(51) Int. Cl.
*G10K 11/16* (2006.01)
*F17C 13/12* (2006.01)

(52) U.S. Cl.
CPC ............ *G10K 11/161* (2013.01); *F17C 13/12* (2013.01)

(58) Field of Classification Search
CPC ........... F17C 7/02; F17C 13/12; F16L 55/033; G10K 11/161
See application file for complete search history.

(56) References Cited

U.S. PATENT DOCUMENTS 3,648,472 A * 3/1972 Kozlowski ............. F17C 13/12
62/50.5

FOREIGN PATENT DOCUMENTS

CN 201778861 U 3/2011
CN 201983651 U * 9/2011
(Continued)

OTHER PUBLICATIONS

International Search Report issued in PCT/KR2023/013879; mailed Jan. 3, 2024.

(Continued)

*Primary Examiner* — Jeremy A Luks
(74) *Attorney, Agent, or Firm* — Studebaker Brackett PLLC

(57) ABSTRACT

The present disclosure relates to a liquid oxygen vent silencer used in an oxygen production process implemented so as to eliminate potentially explosive elements, and the vent silencer is manufactured using copper plates and stainless (SUS) having no risk of explosions to minimize an edge that collide with oxygen gas, and includes a silencer body that receives cryogenic liquid gas and moves an internal space up and down to reduce noise; and a body support that is installed along an outside of the silencer body and supports the silencer body by raising or lowering the silencer body from a ground.

1 Claim, 4 Drawing Sheets

(56) References Cited

FOREIGN PATENT DOCUMENTS

| | | | | | |
|---|---|---|---|---|---|
| CN | 210303057 | U | * | 4/2020 | |
| CN | 214579659 | U | | 11/2021 | |
| CN | 214889686 | U | * | 11/2021 | ............ A01M 29/32 |
| JP | 2002-371728 | A | | 12/2002 | |
| KR | 10-0139594 | B1 | | 7/1998 | |
| KR | 20-0292942 | Y1 | | 10/2002 | |
| KR | 10-0738480 | B1 | | 7/2007 | |
| KR | 10-0962523 | B1 | | 6/2010 | |
| KR | 10-2017-0049950 | A | | 5/2017 | |
| KR | 101752885 | B1 | * | 7/2017 | |
| KR | 10-2021-0150892 | A | | 12/2021 | |
| KR | 10-2481825 | B1 | | 12/2022 | |

OTHER PUBLICATIONS

"Request for the Submission of an Opinion" Office Action issued in KR 10-2022-0118085; mailed by the Korean Intellectual Property Office on Nov. 25, 2022.

"Written Decision on Registration" Office Action issued in KR 10-2022-0118085; mailed by the Korean Intellectual Property Office on Dec. 21, 2022.

* cited by examiner

LIQUID OXYGEN VENT SILENCER USED IN OXYGEN PRODUCTION PROCESS

CROSS-REFERENCE TO RELATED APPLICATIONS

The present application is a continuation of International Patent Application No. PCT/KR2023/013879, filed Sep. 15, 2023, which is based upon and claims the benefit of priority to Korean Patent Application Nos. 10-2022-0113034, filed on Sep. 6, 2022, 10-2022-0117174, filed on Sep. 16, 2022, and 10-2022-0118085, filed on Sep. 16, 2022. The disclosures of the above-listed applications are hereby incorporated by reference herein in their entirety.

TECHNICAL FIELD

The present disclosure relates to a liquid oxygen vent silencer used in an oxygen production process, and more specifically, to a liquid oxygen vent silencer used in an oxygen production process implemented so as to minimize edges colliding with oxygen gas and eliminate potentially explosive elements.

BACKGROUND ART

Generally, a gas diffusing tower is installed in a gas base station. This gas diffusing tower is installed and used for the purpose of preventing safety accidents by discharging the gas remaining in a gas pipe to the atmosphere when maintenance is required due to an abnormality such as a gas leak in the gas pipe installed in the gas base station, causing the pressure inside the diffusing tower to exceed a set value.

This type of gas diffusing tower may be installed vertically at a height of about 20 to 30 m at a predetermined location on a gas pipe connection line of the gas base station, a scaffolding may be installed at a predetermined location on an outer side of a central portion and an outer side of an upper end portion of the diffusing tower so that a worker can climb up and perform the intended work, and a ladder may be installed from the ground to the scaffolding on the outer side of the upper end portion so that the worker can climb up to the scaffolding.

In addition, a lid is installed on the upper portion of the diffusing tower so that the lid can be opened and closed.

As described above, when gas leaks from the gas pipe and the gas pressure inside the diffusing tower rises above the set value, the lid of the gas diffusing tower is opened so that the gas inside the gas diffusing tower is discharged into the atmosphere, thereby preventing safety accidents such as gas explosions from occurring, and the gas pipe installed on the lower portion of the inside of the gas diffusing tower can be inspected or the remaining gas in the gas pipe can be discharged for maintenance.

However, in the related art, there is a problem that when gas leaked from the gas pipe through the gas diffusing tower and the gas pressure inside the diffusing tower increases above the set value, or when gas is discharged through the diffusing tower to perform maintenance and inspection of the gas pipe, high acoustic energy and strong pulse-type pressure waves (impulsive noise with a duration) are generated due to the speed and pressure of the gas discharged at high pressure and high speed.

Therefore, in order to solve the above problem, even in the related art, a silencer having built-in sound-absorbing material is installed at the upper end portion of the diffusing tower to reduce noise when gas is discharged.

However, even in this case, when low-pressure discharge gas with a flow rate of at least 30 m/see or less flows into the silencer through the diffusing tower, the sound-absorbing material built into the diffusing tower is damaged by the high-temperature and high-pressure discharge gas and scattered, and thus, proper sound absorption cannot be achieved. In addition, there is a problem that the lifespan of the silencer is shortened and frequent maintenance is required.

Meanwhile, the aforementioned background technology is technical information that the present inventor possesses for deriving the present disclosure or acquires in the process of deriving the present disclosure, and cannot necessarily be said to be a publicly known technology disclosed to the general public before the application of the present disclosure.

Technical Problem

One aspect of the present disclosure is to provide a liquid oxygen vent silencer used in an oxygen production process that is manufactured using copper plates and stainless (SUS) having no risk of explosions to minimize edges that collide with oxygen gas and implemented so as to eliminate potentially explosive elements.

The technical problem of the present disclosure is not limited to the technical problem mentioned above, and other technical problems that are not mentioned can be clearly understood by those skilled in the art from the description below.

Technical Solution

According to one embodiment of the present disclosure, a liquid oxygen vent silencer used in an oxygen production process includes: a silencer body that receives cryogenic liquid gas and moves an internal space up and down to reduce noise; and a body support that is installed along an outside of the silencer body and supports the silencer body by raising or lowering the silencer body from a ground.

In one embodiment, the silencer body may include a first pipe that is formed in a cylindrical shape forming a sealed internal space, a second pipe that is formed in a cylindrical shape having a diameter smaller than that of the first pipe and installed along an inner side of the first pipe, has a lower end exposed to a lower side of the first pipe to receive the cryogenic liquid gas and deliver the cryogenic liquid gas to the internal space of the first pipe, and a third pipe that is formed in a cylindrical shape having a diameter smaller than that of the first pipe and a diameter larger than that of the second pipe and installed in a space between the first pipe and the second pipe, receives the cryogenic liquid gas which is raised along the internal space of the second pipe and discharged into the internal space through an upper side of the second pipe, lowers the cryogenic liquid gas along a space between an outer peripheral surface and an inner peripheral surface of the second pipe, raises the lowered cryogenic liquid gas again through a space between an inner peripheral surface and an outer peripheral surface of the first pipe, and then discharges the cryogenic liquid gas to an outside through an upper side of the first pipe.

In one embodiment, the liquid oxygen vent silencer used in an oxygen production process may further include a copper soundproofing material installed along a space between the outer peripheral surface of the second pipe and an inner peripheral surface of the third pipe.

In one embodiment, a flange may be installed in a lower end of the second pipe exposed to a lower side of the first pipe, an upper end of the second pipe may be sealed by a pipe cap, and a first perforation portion having perforation holes repeatedly formed may be formed at an upper portion of the second pipe to discharge the cryogenic liquid gas raised along the internal space from the flange.

In one embodiment, a lower end of the third pipe may be disposed spaced upward from a bottom surface of the internal space of the first pipe, a second perforation portion having perforation holes repeatedly formed along a lower portion of the third pipe may be formed to discharge the cryogenic liquid gas lowered along the space between the outer peripheral surface and the inner peripheral surface of the second pipe, the third pipe may include a third perforation portion having perforation holes repeatedly formed along an upper portion of the third pipe installed along an edge of an opening portion formed at the upper end of the first pipe to discharge the cryogenic liquid gas raised again through the space between the inner peripheral surface and the outer peripheral surface of the first pipe to the outside through the upper side of the first pipe, and a lower end of the third perforation portion may be seal-formed to prevent the cryogenic liquid gas discharged to the upper side of the first pipe from flowing into the internal space.

In one embodiment, the liquid oxygen vent silencer used in an oxygen production process may further include a purge cap installed in the lower end of the first pipe.

In one embodiment, the liquid oxygen vent silencer used in an oxygen production process may further include a buffer-type auxiliary support portion that is installed along an outer side of the first pipe to support the first pipe and absorbs vibration or shock transferred from the first pipe during the noise reduction process.

In one embodiment, the buffer-type auxiliary support portion may include a ring-shaped frame that is formed in a circular ring shape having a diameter larger than that of the first pipe and disposed to cover the outer side of the first pipe, a plurality of supports that are installed at regular intervals along an outer side of the ring-shaped frame to support the ring-shaped frame, a plurality of movable buffer units that are installed at regular intervals along an inner peripheral surface of the ring-shaped frame and disposed along the outer peripheral surface of the first pipe, support the outer peripheral surface of the first pipe while moving along the inner peripheral surface of the ring-shaped frame, and absorb vibration or shock transferred from the first pipe, and a movable buffer unit that rotatably drives the movable buffer unit.

The movable buffer unit may include a rotating ring that is formed in a circular ring shape corresponding to a shape of a sliding groove formed along the inner peripheral surface of the ring-shaped frame, installed along the inner side of the sliding groove and configured so that a plurality of the movable buffer units are installed at regular intervals along the inner peripheral surface, and a ring rotation gear that is connected and interlocked with a gear tooth formed along an outer peripheral surface of the rotating ring and rotates in a forward or reverse direction to rotatably drive the rotating ring.

The rotation driving unit may include a rotational block that is installed on the inner peripheral surface of the rotating ring, a first support wheel that is installed so as to be rotatably connected to one side of a front end of the rotational block and exposed from the sliding groove and closely seated on the outer peripheral surface of the first pipe, and moves while rotating along the outer peripheral surface of the first pipe as the rotational block moves, and a second support wheel that is installed so as to be rotatably connected to the other side of the front end of the rotational block and exposed from the sliding groove and closely seated on the outer peripheral surface of the first pipe, and moves while rotating along the outer peripheral surface of the first pipe as the rotational block moves.

The rotational block may include a first block that is installed on the inner peripheral surface of the rotating ring, a block seating groove that is formed at a front end of the first block, a second block which is seated on the block seating groove and has a front end exposed from the block seating groove and in which the first support wheel and the second support wheel are installed so as to be rotatably connected to one side and the other side of the front end, and a plurality of block support springs that are spaced apart from each other along the inner side of the block seating groove to support the second block installed in the block seating groove and absorb vibration or shock transferred from the second block.

Advantageous Effects

According to one aspect of the present disclosure described above, since the liquid oxygen vent silencer is manufactured using copper plates and stainless (SUS) having no risk of explosions to minimize edges that collide with oxygen gas, it is possible to eliminate potentially explosive elements.

The effect of the present disclosure is not limited to the effects mentioned above, and various effects can be included within a range that is obvious to a person skilled in the art from the contents described below.

DETAILED DESCRIPTIONS

Figure 1:
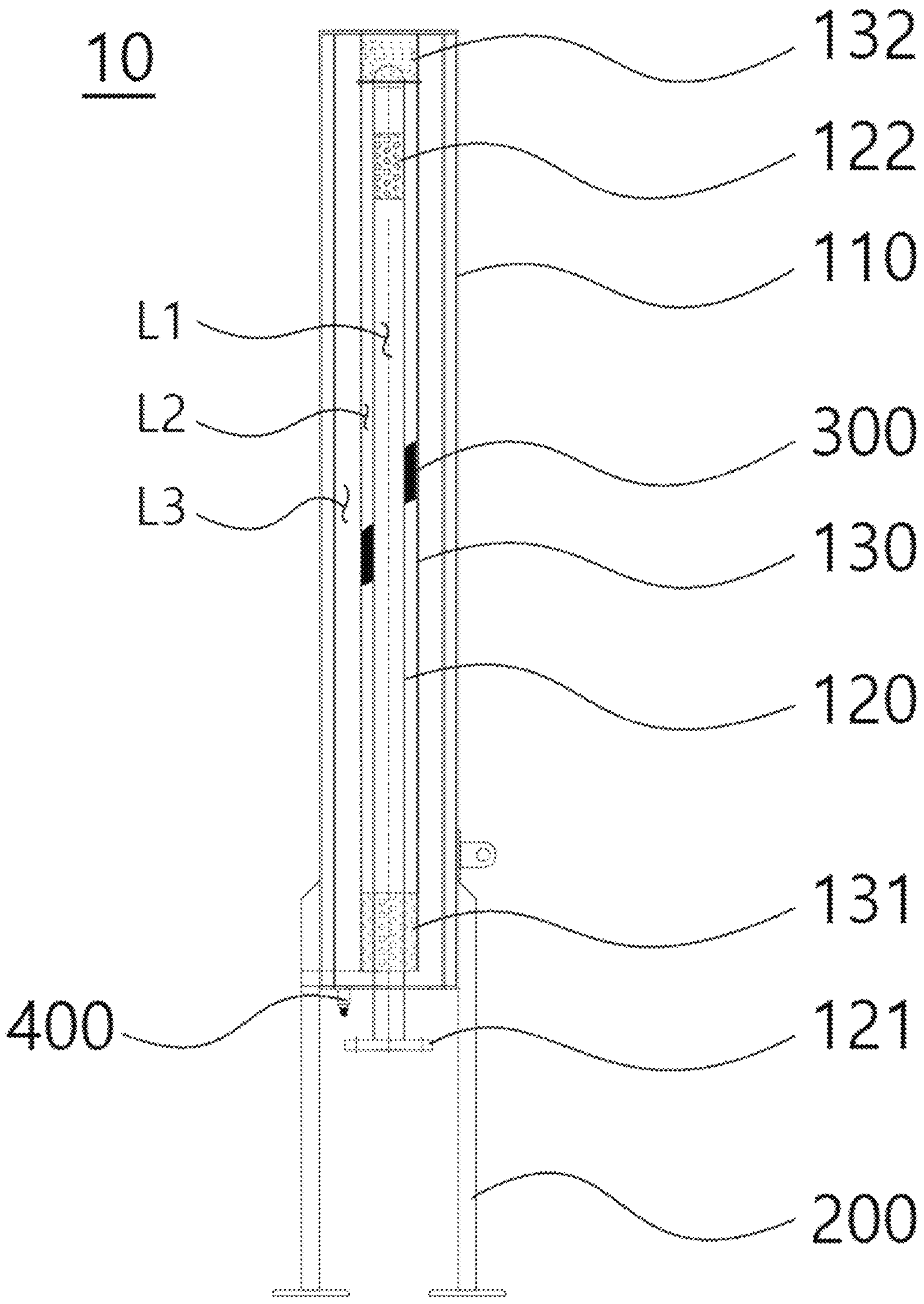
FIG. 1 is a view illustrating a schematic configuration of a liquid oxygen vent silencer used in an oxygen production process according to one embodiment of the present disclosure.
Figure 2:
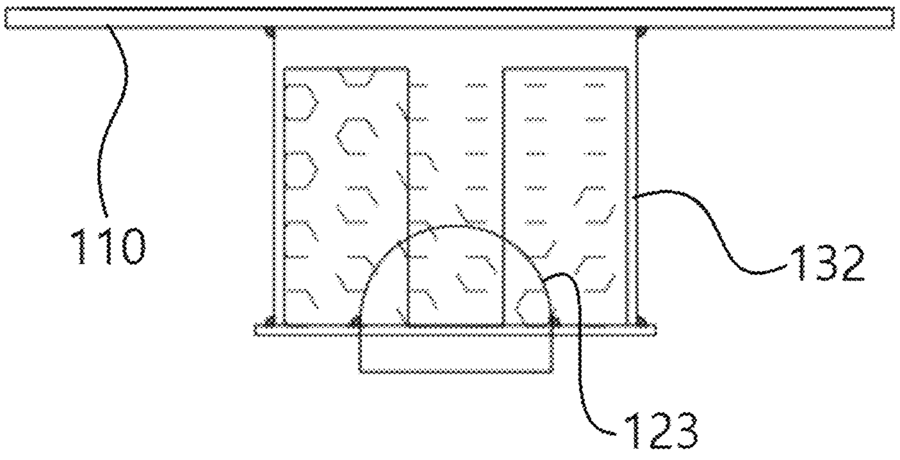
FIG. 2 is a view illustrating an upper end of a second pipe of FIG. 1.

The detailed description of the present disclosure described below refers to the accompanying drawings, which illustrate specific embodiments in which the present disclosure may be implemented. These embodiments are described in sufficient detail to enable those skilled in the art to practice the present disclosure. It should be understood that the various embodiments of the present disclosure are different from each other, but are not necessarily mutually exclusive. For example, specific shapes, structures, and characteristics described herein may be implemented in other embodiments without departing from the spirit and scope of the present disclosure with respect to one embodiment. It should also be understood that the location or arrangement of individual components within each disclosed embodiment may be changed without departing from the spirit and scope of the present disclosure. Accordingly, the detailed description set forth below is not intended to be limiting, and the scope of the present disclosure is limited only by the appended claims, along with the full scope equivalent to what the claims assert, if properly described. Similar reference numerals in the drawings designate the same or similar functions throughout.

Hereinafter, preferred embodiments of the present disclosure will be described in more detail with reference to the drawings.

FIG. 1 is a view illustrating a schematic configuration of a liquid oxygen vent silencer used in an oxygen production process according to one embodiment of the present disclosure.

Referring to FIG. 1, a liquid oxygen vent silencer 10 used in an oxygen production process according to one embodiment of the present disclosure includes a silencer body 100 and a body support 200.

The silencer body 100 reduces noise by receiving cryogenic liquid gas and moving an internal space up and down.

In one embodiment, the silencer body 100 may include a first pipe 110, a second pipe 120, and a third pipe 130.

The first pipe 110 is formed in a cylindrical shape forming a sealed internal space L1.

The second pipe 120 is formed in a cylindrical shape having a diameter smaller than that of the first pipe 110 and is installed along the inner side of the first pipe 110, and a lower end of the second pipe is exposed to the lower side of the first pipe 110 to receive the cryogenic liquid gas and deliver the cryogenic liquid gas to the internal space of the first pipe 110.

In one embodiment, the second pipe 120 may have a flange 121 installed at the lower end exposed to the lower side of the first pipe 110, an upper end of the second pipe may be sealed by a pipe cap, and a first perforation portion 122 having perforation holes repeatedly formed may be formed at the upper portion of the second pipe to discharge the cryogenic liquid gas rising along the internal space from the flange 121.

In one embodiment, the upper end of the second pipe 120 may be sealed by an upper cap 123.

The third pipe 130 is formed in a cylindrical shape that has a diameter smaller than that of the first pipe 110 and larger than that of the second pipe 120 and installed in a space between the first pipe 110 and the second pipe 120. Moreover, the third pipe receives the cryogenic liquid gas that is raised along the internal space L1 of the second pipe 120 and discharged into the internal space through the upper side of the second pipe 120, lowers the cryogenic liquid gas along a space L2 between the outer peripheral surface and the inner peripheral surface of the second pipe 120, raises the lowered cryogenic liquid gas again through a space L3 between the inner peripheral surface and the outer peripheral surface of the first pipe 110, and then discharges the raised cryogenic liquid gas to the outside through the upper side of the first pipe 110.

In one embodiment, the lower end of the third pipe 130 may be disposed spaced upward from a bottom surface of the internal space of the first pipe 110, a second perforation portion 131 having perforation holes repeatedly formed along a lower portion of the third pipe may be formed to discharge the cryogenic liquid gas lowered along the space between the outer peripheral surface and the inner peripheral surface of the second pipe 120, the third pipe may include a third perforation portion 132 having perforation holes repeatedly formed along an upper portion of the third pipe installed along an edge of an opening portion formed at the upper end of the first pipe 110 to discharge the cryogenic liquid gas raised again through the space between the inner peripheral surface and the outer peripheral surface of the first pipe 110 to the outside through the upper side of the first pipe 110, and the lower end of the third perforation portion may be seal-formed to prevent the cryogenic liquid gas discharged to the upper side of the first pipe 110 from flowing into the internal space.

In one embodiment, the first pipe 110, the second pipe 120, and the third pipe 130 may be manufactured with stainless steel (SUS, a safe material for preventing explosion accidents due to oxygen gas, a durable copper material, and a stainless-steel material that maintains sufficient thickness and strength) to minimize edges that collide with oxygen gas and eliminate potentially explosive elements, so that noise can be implemented to be 50 db or less.

The liquid oxygen vent silencer 10 used in an oxygen production process according to one embodiment of the present disclosure having the configuration described above may further include a soundproofing material 300.

The soundproofing material 300 is manufactured with a copper material installed along the space between the outer peripheral surface of the second pipe 120 and the inner peripheral surface of the third pipe 130.

The liquid oxygen vent silencer 10 used in an oxygen production process according to one embodiment of the present disclosure having the configuration described above may further include a purge cap 400.

The fuzzy cap 400 is installed at the lower end of the first pipe 110.

The body support 200 is installed along the outer side of the silencer body 100 to support the silencer body 100 by raising or lowering the silencer body from the ground.

The liquid oxygen vent silencer 10 used in an oxygen production process according to one embodiment of the present disclosure having the configuration described above can implement the cryogenic vent silencer that enables safe and comfortable discharge by eliminating the risk of noise and gas generated when the cryogenic liquid gas expands 600-700 times into the atmosphere during venting.

Figure 3:
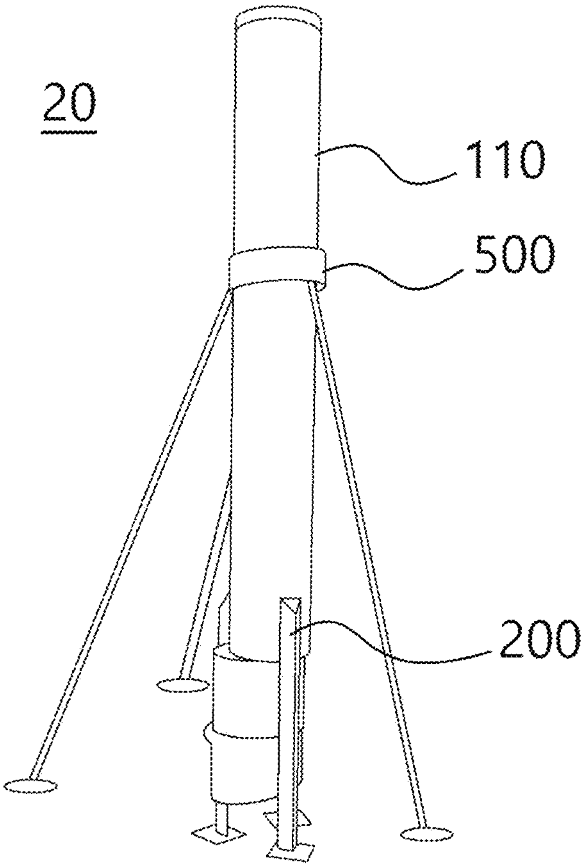
FIG. 3 is a view illustrating a schematic configuration of a liquid oxygen vent silencer used in an oxygen production process according to another embodiment of the present disclosure.

FIG. 3 is a view illustrating a schematic configuration of a liquid oxygen vent silencer used in an oxygen production process according to another embodiment of the present disclosure.

Referring to FIG. 3, a liquid oxygen vent silencer 20 used in an oxygen production process according to another embodiment of the present disclosure includes a silencer body 100, a body support 200, and a buffer-type auxiliary support portion 500.

Here, the silencer body 100 and the body support 200 are the same as the components of FIG. 1, so descriptions thereof will be omitted.

The buffer-type auxiliary support portion 500 is installed along the outer side of the first pipe 110 to support the first pipe 110 and to absorb vibration or shock transferred from the first pipe 110 during a noise reduction process.

The liquid oxygen vent silencer 20 used in an oxygen production process according to another embodiment of the present disclosure having the configuration described above can improve the noise reduction effect by absorbing vibration or shock caused by noise that may occur during the expansion process of the cryogenic liquid gas.

Figure 4:
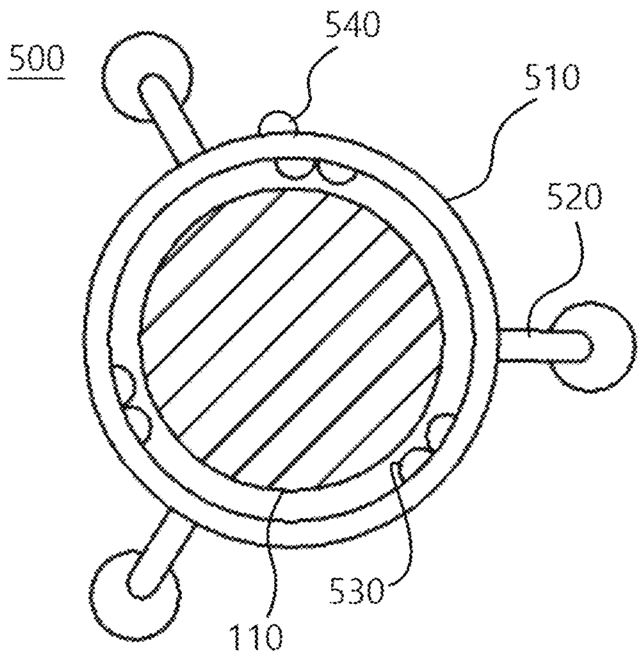
FIG. 4 is a view illustrating a buffer-type auxiliary support portion of FIG. 3.

FIG. 4 is a view illustrating the buffer-type auxiliary support portion of FIG. 3.

Referring to FIG. 4, the buffer-type auxiliary support portion 500 includes a ring-shaped frame 510, a plurality of supports 520, a movable buffer unit 530, and a movable buffer unit 540.

The ring-shaped frame 510 is formed in a circular ring shape having a diameter larger than the diameter of the first pipe 110 and is disposed to cover the outer side of the first pipe 110.

The plurality of supports 520 are installed at regular intervals along the outer side of the ring-shaped frame 510 to support the ring-shaped frame 510.

The movable buffer unit 530 is installed in multiple units (preferably at least 3 units) spaced apart at regular intervals along the inner peripheral surface of the ring-shaped frame 510 and disposed along the outer peripheral surface of the first pipe 110. Moreover, the movable buffer unit supports the outer peripheral surface of the first pipe 110 while moving along the inner peripheral surface of the ring-shaped frame 510 and absorbs the vibration or shock transferred from the first pipe 110.

The movable buffer unit 540 drives the movable buffer unit 530 to rotate.

The buffer-type auxiliary support portion 500 having the configuration described above not only supports the first pipe 110 so that the first pipe can be stably erected, but also effectively absorbs the vibrations or shocks generated from the first pipe 110 by using the plurality of movable buffer units 530 that move in close contact along the outer peripheral surface of the first pipe 110.

Figure 5:
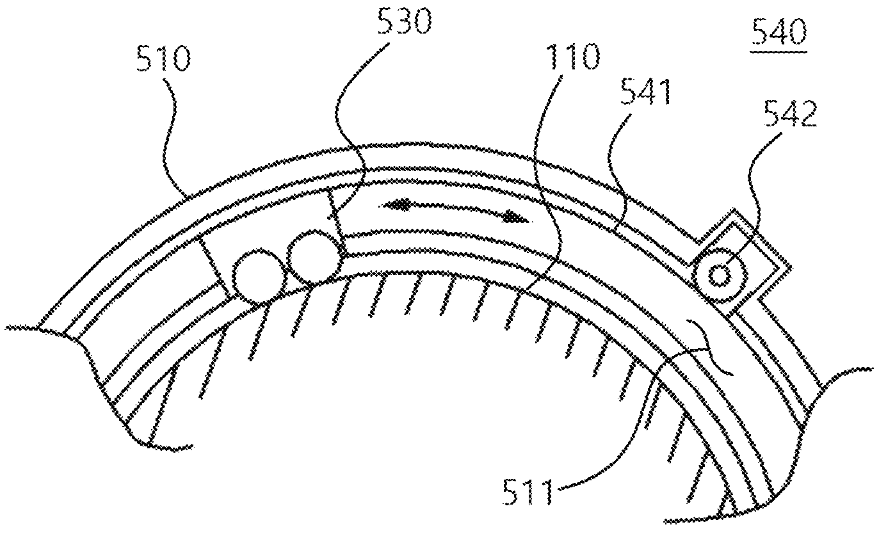
FIG. 5 is a view illustrating a movable buffer unit of FIG. 4.

FIG. 5 is a view illustrating the movable buffer unit of FIG. 4.

Referring to FIG. 5, the movable buffer unit 540 includes a rotating ring 541 and a ring rotation gear 542.

The rotating ring 541 is formed in a circular ring shape corresponding to the shape of a sliding groove 511 formed along the inner peripheral surface of the ring-shaped frame 510, and is installed along the inner side of the sliding groove, and a plurality of movable buffer units 540 are installed at regular intervals along the inner peripheral surface of the rotating ring.

The ring rotation gear 542 is connected and interlocked with a gear tooth (not illustrated in the drawing for convenience of explanation) formed along the outer peripheral surface of the rotating ring 541, and is rotated in the forward or reverse direction by a driving device such as a step motor (not illustrated in the drawing for convenience of explanation) to rotatably drive the rotating ring 541.

Figure 6:
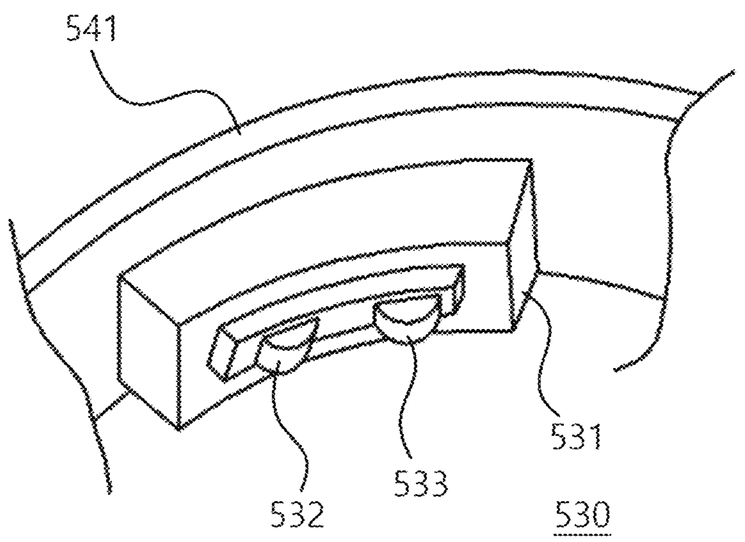
FIG. 6 is a view illustrating the movable buffer unit of FIG. 5.

FIG. 6 is a view illustrating the movable buffer unit of FIG. 5.

Referring to FIG. 6, the movable buffer unit 530 includes a rotational block 531, a first support wheel 532, and a second support wheel 533.

The rotational block 531 is installed on the inner peripheral surface of the rotating ring 541 and slides along the sliding groove 511, and the first support wheel 532 and the second support wheel 533 are installed so as to be rotatably connected to the front end of the rotational block.

The first support wheel 532 is installed so as to be rotatably connected to one side of the front end of the rotational block 531, is exposed from the sliding groove 511 and is closely seated on the outer peripheral surface of the first pipe 110, moves while rotating along the outer peripheral surface of the first pipe 110 as the rotational block 531 moves, and transfers vibration or shock transferred from the first pipe 110 to the rotational block 531.

The second support wheel 533 is installed so as to be rotatably connected to the other side of the front end of the rotational block 531, is exposed from the sliding groove 511 and is closely seated on the outer peripheral surface of the first pipe 110, moves while rotating along the outer peripheral surface of the first pipe 110 as the rotational block 531 moves, and transfers vibration or shock transferred from the first pipe 110 to the rotational block 531.

Figure 7:
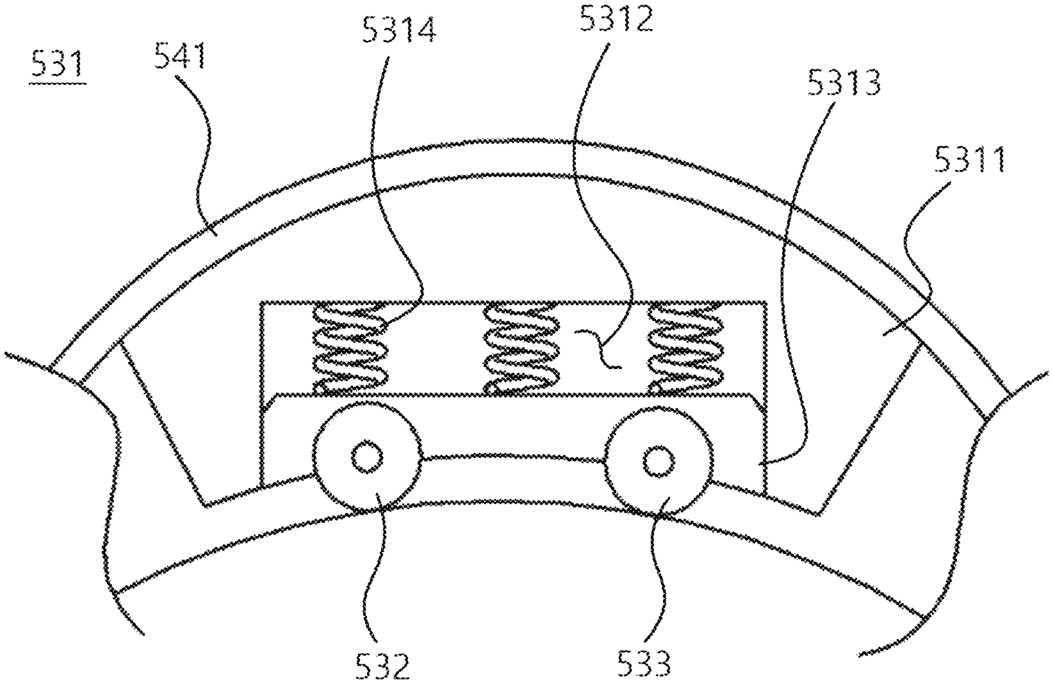
FIG. 7 is a view illustrating a rotational block of FIG. 6.

FIG. 7 is a view illustrating the rotational block of FIG. 6.

*Referring to FIG. 7, the rotational block 531 includes a first block 5311, a block seating groove 5312, a second block 5313, and a plurality of block support springs 5314.

The first block 5311 is installed on the inner peripheral surface of the rotating ring 541, and components such as the block seating groove 5312, the second block 5313, and the plurality of block support springs 5314 are installed in the first block.

The block seating groove 5312 is formed at the front end of the first block 5311, and a second block 5313 is installed in the block seating groove.

The second block 5313 is seated on the block seating groove 5312, the front end of the second block is exposed from the block seating groove 5312, and the first support wheel 532 and the second support wheel 533 are installed so as to be rotatably connected to one side and the other side of the front end of the second block.

The plurality of block support springs 5314 are installed spaced apart from each other along the inner side of the block seating groove 5312 to support the second block 5313 installed in the block seating groove 5312, and absorb the vibration or shock transferred from the second block 5313.

The rotational block 531 having the configuration described above can effectively absorb the vibration or shock transferred from the first support wheel 532 and the second support wheel 533.

The above-described embodiments are for illustrative purposes, and those skilled in the art will understand that the above-described embodiments can be easily modified into other specific forms without changing the technical idea or essential features of the above-described embodiments. Therefore, the above-described embodiments should be understood as illustrative in all respects and not restrictive. For example, each component described as a single type may be implemented in a distributed manner, and likewise, components described as distributed may be implemented in a combined form.

The scope of protection sought through this specification is indicated by the claims described below rather than the detailed description above, and should be interpreted to include all changes or modified forms derived from the meaning and scope of the claims and their equivalent concepts.

The invention claimed is:

1. A liquid oxygen vent silencer used in an oxygen production process, the liquid oxygen vent silencer comprising:

a silencer body that receives cryogenic liquid gas and moves an internal space up and down to reduce noise; and a body support that is installed along an outside of the silencer body and supports the silencer body by raising or lowering the silencer body from a ground wherein the silencer body includes a first pipe that is formed in a cylindrical shape forming a sealed internal space, a second pipe that is formed in a cylindrical shape having a diameter smaller than that of the first pipe and installed along an inner side of the first pipe, has a lower end exposed to a lower side of the first pipe to receive the cryogenic liquid gas and deliver the cryogenic liquid gas to the internal space of the first pipe, and a third pipe that is formed in a cylindrical shape having a diameter smaller than that of the first pipe and a diameter larger than that of the second pipe and installed in a space between the first pipe and the second pipe, receives the cryogenic liquid gas which is raised along the internal space of the second pipe and discharged into the internal space through an upper side of the second pipe, lowers the cryogenic liquid gas along a space between an outer peripheral surface and an inner peripheral surface of the second pipe, raises the lowered cryogenic liquid gas again through a space between an inner peripheral surface and an outer peripheral surface of the first pipe, and then discharges the cryogenic liquid gas to the outside through an upper side of the first pipe, the liquid oxygen vent silencer further includes a buffer-type auxiliary support portion that is installed along an outer side of the first pipe to support the first pipe and absorb vibration or shock transferred from the first pipe during the noise reduction process, the buffer-type auxiliary support portion includes a ring-shaped frame that is formed in a circular ring shape having a diameter larger than that of the first pipe and disposed to cover the outer side of the first pipe, a plurality of supports that are installed at regular intervals along an outer side of the ring-shaped frame to support the ring-shaped frame, a plurality of movable buffer units that are installed at regular intervals along an inner peripheral surface of the ring-shaped frame and disposed along the outer peripheral surface of the first pipe, support the outer peripheral surface of the first pipe while moving along the inner peripheral surface of the ring-shaped frame, and absorb vibration or shock transferred from the first pipe, and a movable buffer unit that rotatably drives the movable buffer unit, the movable buffer unit includes a rotating ring that is formed in a circular ring shape corresponding to a shape of a sliding groove formed along the inner peripheral surface of the ring-shaped frame, installed along the inner side of the sliding groove and configured so that a plurality of the movable buffer units are installed at regular intervals along the inner peripheral surface, and a ring rotation gear that is connected and interlocked with a gear tooth formed along an outer peripheral surface of the rotating ring and rotates in a forward or reverse direction to rotatably drive the rotating ring, and the movable buffer unit includes a rotational block that is installed on the inner peripheral surface of the rotating ring, a first support wheel that is installed so as to be rotatably connected to one side of a front end of the rotational block and exposed from the sliding groove and closely seated on the outer peripheral surface of the first pipe, and moves while rotating along the outer peripheral surface of the first pipe as the rotational block moves, and a second support wheel that is installed so as to be rotatably connected to the other side of the front end of the rotational block and exposed from the sliding groove and closely seated on the outer peripheral surface of the first pipe, and moves while rotating along the outer peripheral surface of the first pipe as the rotational block moves.

* * * * *